United States Patent Office 3,023,996
Patented Mar. 6, 1962

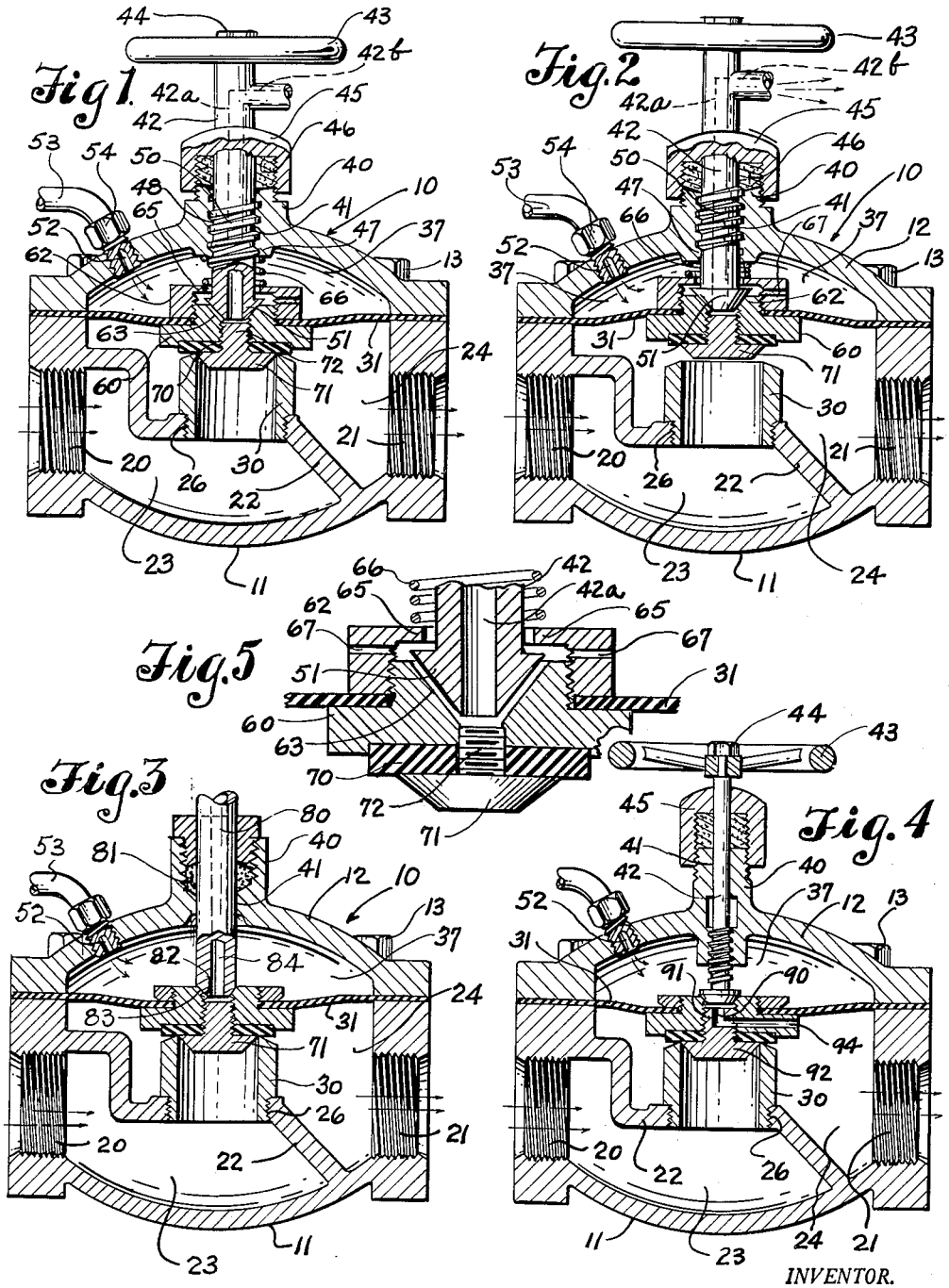

3,023,996
PILOT CONTROLLED DIAPHRAGM VALVE
Neil F. Robertson, 6360 School St., Tacoma, Wash.
Filed Oct. 12, 1959, Ser. No. 845,783
4 Claims. (Cl. 251—14)

This invention relates to valves and more particularly to improvements in diaphragm type "globe" valves and to novel means and mechanisms for opening, regulating and closing the same.

It is the principal object of this invention to provide a new and simplified means whereby a relatively large valve member may be more easily and more quickly opened, closed and regulated either manually or mechanically.

Another object of this invention is to provide means for opening, closing, or regulating a valve which may be readily embodied in diaphragm valves of the present day "globe" type without requiring material alteration thereof.

A further object of this invention is to provide a valve construction wherein the pressure medium passing through the valve or a foreign medium may be used to assist in opening, regulating and closing the valve and in holding the valve in closed position.

Another object of this invention is to provide means whereby a diaphragm type globe valve may be readily adjusted to any degree of opening.

A still further object of this invention is to provide a valve construction which is relatively inexpensive and which may be adapted and incorporated in substantially all types of globe valves presently being manufactured.

Still another object of this invention is the elimination of the expensive, cumbersome and hard to operate yoke, screw mechanism and packing gland presently required in large globe type valves.

A still further object of this invention is to provide a valve structure which may be more readily adapted to remote control mechanisms for operation.

Other objects and advantages of the present invention reside in the details of construction of the various parts thereof and in their combination and mode of operation, as will hereinafter be fully described.

In accomplishing the above mentioned and other objects of the invention, I have provided the improved details of construction, the typical forms of which are illustrated in the accompanying drawings wherein:

FIG. 1 is a vertical section of a valve embodied by this invention, with the valve in closed position.

FIG. 2 is a vertical section of the valve of FIG. 1 with the valve in open position.

FIG. 3 is an axial section of a valve of an alternative construction embodied by the invention.

FIG. 4 is an axial section of still another alternative construction.

FIG. 5 is an enlarged vertical section of the pilot valve illustrated in FIG. 1.

This application is a continuation-in-part of my copending application Serial No. 677,495, filed August 12, 1957, and now abandoned.

In conventional or standard types of globe valves, and especially in the larger ones, substantial force or effort is required to open and close the movable valve member. This is especially true when the pressure or flow of the medium passing through the valves is relatively high. My new and improved valve construction as herein disclosed, greatly reduces the effort or work required to open, close or regulate the valve. Also, it permits a reduction in size of the yoke and packing gland construction. As will hereinafter be explained, I utilize an auxiliary pressure to supplement manual or mechanical effort normally required in opening and closing the valve and a valve constructed in accordance with the teaching of the present invention may be readily opened or closed with a minimum of effort irrespective of the size of the valve or the pressure or flow of medium through the valve.

As previously stated, my improved valve construction may be employed in a substantially standard, diaphragm type, globe valve construction and in the drawing a typical valve is designated in its entirety by reference numeral 10. It is to be clearly understood, however, that my new and improved features may be readily incorporated in other types of valves which include a diaphragm. The valve comprises the hollow body portion 11 and the closing bonnet 12; the latter being secured on the body by means of a plurality of machine bolts 13. This type of construction is commonly referred to as "yoke-type, bolted bonnet, globe valve." However, if desired, the construction commonly referred to as a "union bonnet globe valve" could be substituted for that shown in the accompanying drawings. The bolts 13 extend through the holes in the bonnet rim and are threaded into holes provided to receive them in the rim of the body portion of the valve.

The valve body 11 comprises a threaded inlet opening 20 and a threaded outlet 21. It is interiorly divided by a partition wall 22 to provide the inlet chamber 23 and the outlet chamber 24. The partitioning wall is formed integral with the body with a medial portion thereof lying in the axial plane of the inlet and outlet, and this is formed with a threaded circular opening as at 26 into which the lower end of a relative short valve seating nipple 30 is threaded.

Interposed between the flat rim surfaces of the valve body 11 and bonnet 12 and securely clamped by bolts 13 is a flexible air and water-tight diaphragm 31. This serves, as presently explained, to carry the movable valve element.

The bonnet of the valve illustrated in FIGS. 1 and 2 is of substantially standard construction. It includes an integral, centrally-positioned and upstanding neck 40 formed with an axial bore 41 in which a valve stem 42 is rotatably contained for up and down movement. Because of my improvement, the stem may be somewhat smaller than is normally required. Applied to the outer end of the stem is the usual turning wheel 43 which is held in place by a nut 44. A packing nut 45 is threaded onto the neck and within this nut is a packing material 46. On the inner surface of the bonnet, coaxial with the bore 41 is a boss 47 through which the valve stem bore extends; this part of the bore being internally threaded as at 48.

Adjacent its lower end, the stem is threaded as at 50, and these threads coact with the threads 48 in the boss 47. Thus, the rotation of the handle 43 will cause the stem to be extended into or be withdrawn from the interior of the valve. Secured to the inner end of the valve stem is a conical faced valve disk 51, the purpose of which will be presently described.

Formed through a wall of the bonnet 12, is a passage 52. A supply line or tube 53 is provided and joined to the bonnet by a pipe fitting 54. The supply line 53 provides means for a pressure medium, fluid or air, to enter the chamber 37, as will hereinafter be more fully described.

The diaphragm 31, as secured between the valve body and the bonnet, is of rubber or similar flexible material and a metal, valve seating member 60 is centrally secured to the diaphragm. The seating member 60 is disposed below the diaphragm but has a central portion that projects upwardly through a central opening provided in the diaphragm and is secured by a nut 62 threaded thereon and engaging against the top side of the diaphragm. Centrally located in the upwardly projecting central portion is a valve seat 63 adapted to receive and seat the disk 51 therein. Secured concentrically to the under surface of the seating member 60 is a gasket 70;

this being held in place by a disk 71 which has a stem 72 threaded upwardly into the seating member 60. The gasket 70 has a central opening through which the stem 72 extends.

The disk 71 is adapted to be movably received in the upper end of nipple 30 and the gasket 70, which projects beyond it, is adapted to seat on the upper end of the nipple, thus to provide a top closure for the tubular outlet of chamber 23.

Formed as a part of the nut 62, at the upper end thereof, is an inwardly extending annular flange 65 which surrounds the valve stem 42. The flange is spaced from the stem as is clearly illustrated in FIG. 5. As the valve disk 51 rises it will be retained within the nut 62 by the flange 65. Also, the flange will engage the disk 51 and prevent the disk 71 from seating in the nipple 30 so long as the valve disk 51 is in a raised position as in FIG. 2. This will hold the valve open even though there is no pressure medium passing through the valve. It provides a positive control of the movement of the disk 71. So as to assure the relief of pressure through the passage 42a—42b, I provide a plurality of radial ports 67—67 through the nut 62, as is best seen in FIG. 5.

Seated on the flange 65 and in engagement at its upper end with the boss 47 is a compressible spring 66 which urges the under surface of the flange 65 toward engagement with the top surface of the valve disk 51 and thereby prevents any chatter or fluctuation of the diaphragm in relation to the valve disk 51.

As a means of exhausting or relieving the pressure in the bonnet chamber 37 against the top surface of the diaphragm 31, I provide the stem 42 with an axial passage 42a from its lower end that communicates with a radial passage 42b which is below the handle 43 and above the packing nut 45. The passage 42a—42b is of greater cross-sectional area than inlet passage 52.

The movement of the diaphragm 31 is controlled by the increase or decrease in pressure in the chamber 37 in relationship to the pressure in chamber 23. The pressure in chamber 37 is created by a fluid or gas medium entering the chamber through the passage 52. The pressure medium may be taken from the medium passing through the valve or it may be an entirely foreign gas or fluid medium under pressure.

A valve construction, such as herein before described, is readily closed and the flow of the medium therethrough terminated by causing the disk 71 to move into the upper end of the nipple 30 and the gasket 70 to be seated against the upper end of the nipple as illustrated in FIG. 1. This is accomplished by causing the valve disk 51 to engage, seat in and follow the downward movement of the valve seat 63. When the disk 51 is seated in the seat 63, the escape passage 42a—42b is thereby closed and a pressure is built up in the bonnet chamber due to the fact that the pressure medium entering through the passage 52 is confined within the chamber whereas the fluid passing through the open valve is under reduced pressure because it is permitted to flow. The greater pressure exerted on the upper surface of the diaphragm thereby causes the diaphragm to move downwardly toward closed position. As the wheel 43 and valve stem 42 are rotated clockwise and moved downward, the diaphragm and the main valve disk 71 will be caused to move downward into closed position as illustrated in FIG. 1. It will be understood that the pressure of the medium entering through passage 52 is thus utilized to supplement the slight closing pressure or effort required in turning handle 43 to close the smaller or upper valve which, in turn, results in the closing of the main valve. Also, when the main valve is closed, the confined medium within the upper chamber 37 will exert downward pressure against the diaphragm in holding the valve in closed position due to the substantially greater surface area on the upper side of the diaphragm 31 as compared to the exposed surface area of the disk 71 against which the pressure of the inflowing medium from the main line is exerted.

To open the valve, it is merely necessary to rotate the valve stem 42 and wheel 43 in a counter-clockwise direction to retract the disk 51 and thereby open the escape passage 42a—42b which is larger than the inlet passage 52. The flow of the pressure medium through the escape passage 42a—42b will reduce the pressure in the chamber 37 and permit the diaphragm to lift and retract the disk 71 and washer 70 from their seated or closed position to the open position of FIG. 2. The controlled retraction or positioning of the stem makes it possible to control or limit the opening of the valve to the extent desired or required.

In FIG. 3, I have illustrated an alternative form of construction wherein the valve operates on a similar principle except that I employ a piston type, slidable stem 80 adapted to be depressed or raised by an air motor (not shown) or some other type of power means. In this construction the main valve body and bonnet are substantially the same and I employ a pressure medium entering through the passage 52. The stem merely reciprocates in the packing 81 and has a valve head as at 82 which engages the seat 83. The pressure release passage 84 extend axially between opposite ends of the stem so that when the valve head is retracted from engagement with the seat 83, the main valve disk 71 will rise and permit flow through the valve. By upward or downward movement of the stem, 80 I am able to control the opening and closing of the valve with a minimum of effort and I can position the valve at any desired extent of opening. Except for the particular parts described, I have designated the other parts with reference numerals corresponding to those in FIGS. 1 and 2.

In FIG. 4, I have illustrated still another alternative form of construction wherein the pressure release passage 90 is formed in the stem 91 of disk 92. The passage 90 joins with the radial passage 94 which opens into the valve chamber 24. As in constructions previously described, I have designated common parts with the same reference numerals and also in this construction the cross-sectional area of passage 90—94 is greater than the area of passage 52.

In the several valve constructions, the opening and closing of the valve element by the hand wheel air motor or other means is relatively easy. Adjusting the valve disk 51 upwardly permits a follow-up opening movement of the main valve and the medium flows through the valve. Similarly closing or downward adjustment of the valve 51 results in a closing action of the main valve. In each case the closing or opening forces are effected by the pressure medium in the pressure chamber 37 above the diaphragm 31.

In the drawings, I have illustrated constructions that employ stems that are screwed or reciprocated inwardly or outwardly to open or close the valves. It will be readily appreciated that the particular stem construction or manner in which the stem is movable may be altered without departing from my invention. The stem may be of a plunger type and it may be mechanically, hydraulically, or electrically operated. It is, however, an important feature of my invention that the stem be so mounted and actuated that it may be positively controlled in any position of setting. This permits a setting of the valve at the desired position of opening. It is not necessary that the valve be opened fully or completely closed.

In a valve similar to that illustrated herein, it is possible to regulate the opening and closing of the valve by the regulation of a gas or fluid pressure admitted to and discharged from the upper side of the diaphragm. In such construction, no external controls act on the primary valve.

In the drawings, I have illustrated what I believe to be a typical, relatively small, low pressure, diaphragm type globe valve. It will be understood that the construction would be somewhat modified for large, high pressure valves but that the novel features of my invention may be readily employed without departing from the teaching of this application.

What I claim as new is:

1. A valve of the character described comprising a housing defining an inlet chamber, an outlet chamber and a pressure chamber, said inlet chamber being separated from the outlet chamber by a fixed partitioning wall and said outlet chamber being separated from the pressure chamber by a flexible partitioning diaphragm, said inlet chamber having an inlet for inflow of a fluid medium under pressure and said fixed partitioning wall having a flow passage therethrough for outflow of said fluid medium from the inlet chamber into the outlet chamber and said outlet chamber having an outlet to accommodate the outflow of fluid, a valve member fixed to said diaphragm through an opening therein and movable therewith to control flow through said flow passage in the fixed partitioning wall a passage leading from exterior of said housing into the pressure chamber for introducing a medium under pressure into said pressure chamber, a valve stem mounted in an opening through the housing and extending into said pressure chamber, a valve face at the inner end of said stem, a pressure relief passage formed axially through said stem and extending from the inner end thereof to the exterior of said housing, said valve face being adjustable, incident to the movement of the stem, into and from engagement with said valve member to open or close the said pressure relief passage and thereby control the position and movement of the diaphragm under influence of pressures against its opposite sides, and the positioning of the valve member that is fixed thereto, relative to the flow passage in the fixed partitioning wall.

2. A valve of the character described comprising a housing defining an inlet chamber, an outlet chamber and a pressure chamber, said inlet chamber being separated from the outlet chamber by a fixed partitioning wall and said outlet chamber being separated from the pressure chamber by a flexible partitioning diaphragm, said inlet chamber having an inlet for inflow of a fluid medium under pressure and said fixed partitioning wall having a flow passage therethrough for outflow of said fluid medium from the inlet chamber into the outlet chamber and said outlet chamber having an outlet to accommodate the outflow of fluid, a valve member fixed to said diaphragm through an opening therein and movable therewith to control flow through said flow passage in the fixed partitioning wall, a passage communicating with said pressure chamber for admittance of a pressure medium to said pressure chamber, a valve stem movably mounted in said housing and extending into said pressure chamber, a valve head on the inner end of said valve stem, coupling means secured to said valve member within said pressure chamber, said valve head being reciprocably contained in said coupling and alternatively engageable with said coupling and said valve member to control the movements of said valve member and an axial pressure relief passage through said stem leading to the exterior of said housing.

3. A valve construction as in claim 1 wherein said valve face includes a valve disk formed on the inner end of said stem and wherein a coupling means is secured to said valve member and engageable with said valve disk whereby the valve disk controls the movement of said diaphragm.

4. A valve construction as in claim 3 including a compression spring mounted on said valve disk and in engagement with the interior of said housing within the pressure chamber.

References Cited in the file of this patent

UNITED STATES PATENTS

| 1,988,957 | Newell | Jan. 22, 1935 |
| 2,020,833 | Hansen | Nov. 12, 1935 |

FOREIGN PATENTS

| 3,962 | Great Britain | Sept. 30, 1880 |
| 21,313 | Germany | of 1883 |
| 15,971 | Great Britain | of 1884 |
| 5,615 | Great Britain | of 1915 |